(12) United States Patent
Marsh

(10) Patent No.: US 11,487,102 B2
(45) Date of Patent: Nov. 1, 2022

(54) FISHING MAGNIFIER

(71) Applicant: Robert E Marsh, Kansas City, MO (US)

(72) Inventor: Robert E Marsh, Kansas City, MO (US)

( * ) Notice: Subject to any disclaimer, the term of this patent is extended or adjusted under 35 U.S.C. 154(b) by 97 days.

(21) Appl. No.: 17/230,261

(22) Filed: Apr. 14, 2021

(65) Prior Publication Data

US 2021/0325659 A1 Oct. 21, 2021

Related U.S. Application Data

(60) Provisional application No. 63/107,028, filed on Oct. 29, 2020, provisional application No. 63/011,005, filed on Apr. 16, 2020.

(51) Int. Cl.
*G02B 25/00* (2006.01)
*A01K 97/12* (2006.01)

(52) U.S. Cl.
CPC ............ *G02B 25/005* (2013.01); *A01K 97/12* (2013.01)

(58) Field of Classification Search
CPC ..... G02B 25/002; G02B 25/005; A01K 97/00
See application file for complete search history.

(56) References Cited

U.S. PATENT DOCUMENTS 3,512,875 A * 5/1970 Viollet ................. B43K 29/003
359/809
3,955,884 A 5/1976 Del Pesco, Sr.

* cited by examiner

*Primary Examiner* — Joseph P Martinez

(57) ABSTRACT

A magnifier for use while fishing comprises a bracket for temporary and convenient attachment to a cylindrical fishing rod, a magnifying lens adjustably attached to that bracket, and a rod guide stop that is inserted inside a rod guide to prevent movement of the bracket. The bracket engages a fishing rod and supports a magnifying lens that is conveniently retained in position on the fishing rod thereby enabling use of the magnifying lens by a user in proximity to the fishing rod.

18 Claims, 2 Drawing Sheets

FISHING MAGNIFIER

BACKGROUND OF THE INVENTION

This invention relates to an improved method of assisting an angler in situations where visual magnification is needed. These situations could include tying a fly or lure to a line, tying line segments together, making reel repairs or adjustments, and many others. Often fishing hooks, flies, weights, and other fishing components are very small. Even components that are not small maybe difficult to see in low light conditions and with aging eyes.

The need for magnification when fishing has been recognized, and solutions include magnifying glasses that are carried by the angler, or a pair magnifying lenses that attach to the brim of a cap that flip down when needed. An important element of any magnifier for use in fishing is hands-free use, since holding a magnifying glass in one hand while tying on a fly with the other is completely impractical. The flip down lenses avoid the inconvenience of a separate pair of glasses that must be stowed and put on when needed. The disadvantage of this flip down lens, however, is that it is cumbersome and is easily knocked off by branches or brush, as well as being unattractive and often a distraction.

The present invention is a novel approach to providing a magnifying lens for the specific application of fishing. This invention solves the need for a magnifying lens suitable for use when fishing by utilizing the one thing available in virtually every fishing context where magnification would be needed—a fishing rod. When a fisher is tying on flies or lures, making line adjustments, or doing other things that require magnification, it is almost certain that there is a fishing rod nearby. It might be held under the arm of a user, it might be positioned with one end on the ground and leaned against the shoulder of a user, or it might be leaning against a tree, vehicle, or other object. But in any case, there is a fishing rod nearby, and fishing rods are uniformly cylindrical. In this description the term "fishing rod" means a cylindrical rod at least 3 feet in length, usually but not always with fishing line guides positioned along its length, used for fishing. Rod guides are generally circular rings (either full or partial) that are usually metallic and are spaced along the length of a fishing rod. The fishing line passes through the rod guides.

In most cases the fishing rod has a tapering cylindrical shape. The diameter of a fishing rod used with this invention would generally be between 1/16 and 1 inch in diameter, and generally between 1/8 and 1/2 inch in diameter. Further complicating the attachment of a lens to a fishing rod is that fact that many fishing rods are made of fragile materials and exerting excessive force on the fishing rod, such as to prevent slippage or rotation of the magnifying lens device by virtue of the weight and moment arm of a lens which may be positioned perpendicular to the fishing rod, may cause damage to the fishing rod. Moreover, the surface of fishing rods is almost always wet, requiring even more force to hold a weighted device in position on a rod. To address these issues, an object of this invention is to provide a lens device that is held in position utilizing the existing fishing rod guides.

BRIEF SUMMARY OF THE INVENTION

The present invention is an easily attachable and removable magnifying lens device designed to be positioned on a fishing rod. The invention includes a lens and a bracket for engaging a fishing rod. The device is placed on, against, or around the fishing rod without causing damage to the fishing rod. The lens is moveable to a useful position adjacent to the fishing rod, often approximately perpendicular to the fishing rod. The device further includes a rod guide stop that utilizes a fishing rod guide to support the device in position.

DETAILED DESCRIPTION OF THE INVENTION

Figure 1:
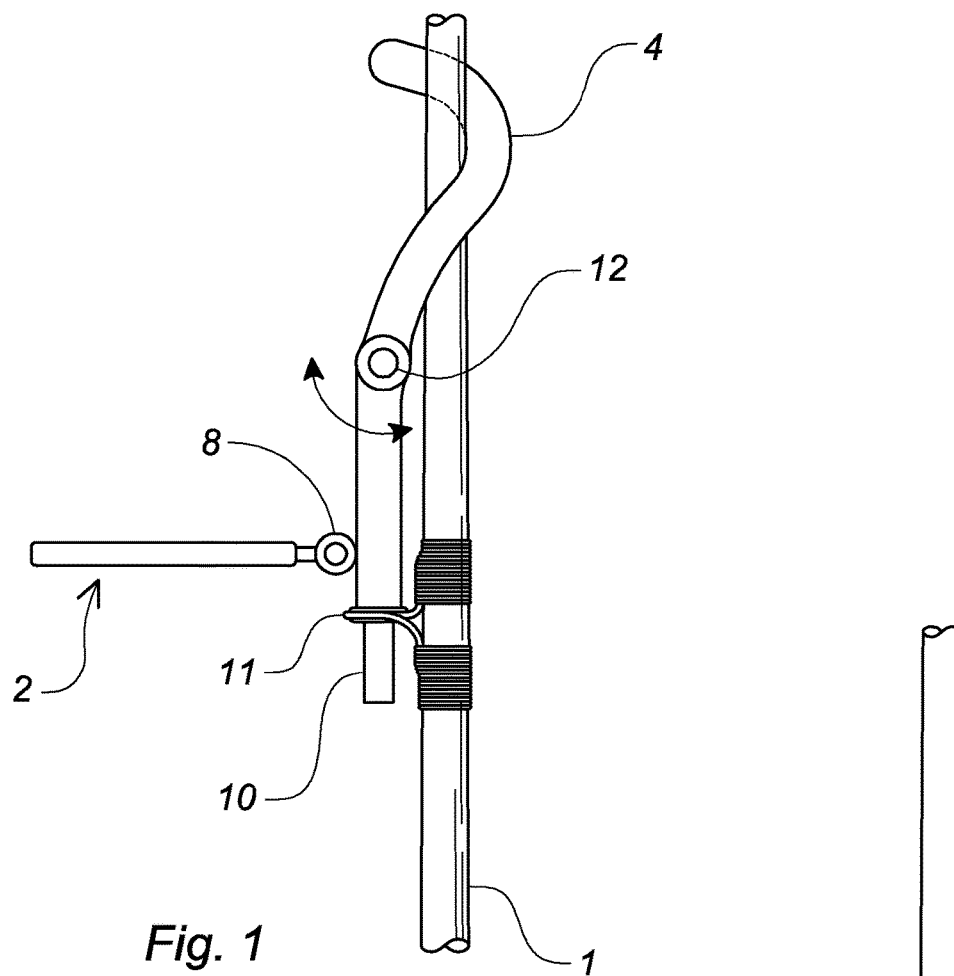
FIG. 1 is a side view of one embodiment of the invention.

As shown in FIG. 1, the magnifying lens device of this invention comprises a lens 2, and a bracket 4 for engaging a fishing rod 1. Bracket 4 contacts fishing rod 1 to hold lens 2 close to the fishing rod, but alone provides sufficient structure or force to prevent vertical movement of the bracket and lens. Joint 8 allows realignment of the lens 2 relative to the fishing rod 1. A protrusion (generally called a rod guide stop 10) is associated with bracket 4 and is positioned for insertion in a fishing rod guide 11 attached to fishing rod 1.

Lens 2 is a typical magnifying lens, typically glass or plastic, and ideally between 1 and 2 inches in diameter. The lens would provide magnification, generally no more than 10×, and preferably between 1.5× and 5×. The magnifying lens could also have adjustable magnification within these ranges as is known in the art.

The term "bracket" is used to describe the structure of this invention that engages the fishing rod. The bracket serves to hold the magnifying lens in close proximity to the fishing rod, stabilized against excessive movement away from the fishing rod. The bracket could take various configurations, with alternate configurations known to one skilled in the art. In FIG. 1, bracket 4 is a simple frame with a portion that rests against fishing rod 1. Or the bracket 4 shown in FIG. 1 could be shaped to partially enclose fishing rod 1. "Engaging" as used in this description means enclosing or resting against a fishing rod. Biasing components (or biasing characteristics of the material of the bracket) may be used to engage the fishing rod, but biasing in not needed for engagement and the bracket could engage the fishing rod by resting against it as shown in the embodiment in FIG. 2. Any force exerted by the bracket 4 on the fishing rod should be light (sometimes referred to as a "light grip")—meaning insufficient to support the weight of the device based only on friction with the fishing rod surface. In the embodiment in FIG. 1 bracket 4 is preferably constructed of a resilient material such as rubber or a suitable polymer to facilitate the bracket 4 engaging the fishing rod.

Joint 8 allows movement of the lens relative to one or more axes. It is useful to have the magnifier rotatable up and down around an axis perpendicular to the fishing rod. If a user desires to change the position of the magnifier in other directions, this could be achieved by simply rotating the fishing rod with the bracket and magnifier attached to the rod with the rod guide hook extended over a guide on the fishing rod. Since fishing rods come in various sizes, a preferred embodiment provides for adjustment of the size of the rod engaging portion of the bracket (and any corresponding opening) and adjustment of the distance from the rod guide hook to the rod engaging portion of the bracket.

In a preferred embodiment the joint 8 is a ball joint, enabling movement relative to multiple axes. The joint should allow movement with steady pressure from the user but be firm enough to not be moved if inadvertently bumped during the magnification process. Optionally, the joint could have a threaded tightening structure well known in the art to be loosened for positioning the lens and then tightened to hold the lens in position.

A fishing rod 1 includes guides spaced along the length of the fishing rod through which fishing line is passed. Because of the spacing of multiple guides, there would be several suitable options for location of the magnifier, and one could be selected that would be most suitable for a given user. Rod guide stop 10 is positioned to be inserted in a fishing rod guide, and enables a substantial portion of the weight of the lens and bracket to be borne by the fishing rod guide. The appropriate fishing rod guide could be selected by the user from among the various guides on the fishing rod based on the desired distance to the lens and how the fishing rod is held when the device is in use. It should be noted that the components of the magnifier are sufficiently light that the rod guide stop does not present excessive strain on the rod guides.

The embodiment in FIG. 1 also includes bracket adjustment joint 12 which may be loosened or tightened to change the distance from fishing rod 1 (when the device is in use) to rod guide stop 10.

A user needing magnification would be in close proximity to fishing rod 1 in FIG. 1. The fishing rod could be supported under the arm of the user or could be leaned against a user's body or a nearby object. The fishing rod would often be in an approximated vertical position, which would mean that when deployed, the magnifying lens would be approximately horizontal (and perpendicular to the fishing rod) then used to magnify an item held below it. The user would place bracket 4 against the fishing rod 1. Bracket 4 is preferably padded to avoid damage to a fragile fishing rod. Rod guide stop 10 is inserted in a selected fishing rod guide from above. The lens could be moved at joint 8 to align it properly for the position of the fishing rod and the user relative to the object needing magnification. Lens position in use would often be approximately perpendicular to the fishing rod (90 degrees to fishing rod) but it could be desirable to position the lens at an angle between 30 and 150 degrees relative to the axis of the fishing rod.

Figure 2:
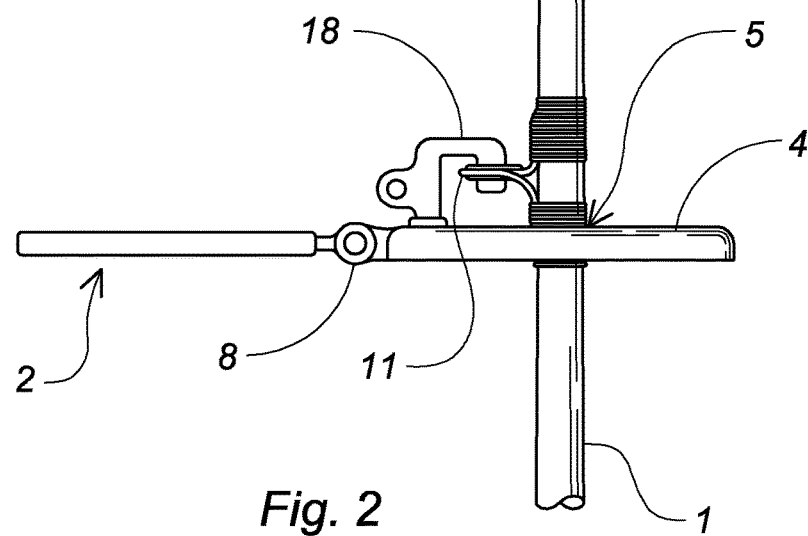
FIG. 2 is a side view of another embodiment of the invention.

A different embodiment is shown in FIG. 2. As shown in FIG. 2, the magnifying lens device of this invention comprises a lens 2, and a bracket 4 for engaging a fishing rod 1. In FIG. 2, the fishing rod 1 is received in an opening 5 in bracket 4. Joint 8 allows realignment of the lens 2 relative to the fishing rod 1. A protrusion, generally called a rod guide stop and in the embodiment shown in FIG. 2 more specifically a rod guide hook 18, is associated with bracket 4 and is positioned for insertion in a fishing rod guide 11 attached to fishing rod 1.

In the embodiment shown in FIG. 2, rod guide hook 18 engages one of the guides of the fishing rod by hooking over the rod guide and thereby anchoring the bracket in position against movement either down the axis of the fishing rod or rotation around the axis of the fishing rod or any axis perpendicular to the fishing rod. Rod guide hook 18 would have a typical hook shape with preferably a square or semi-circular shape with the hook end opening downward (for hooking "over" a rod guide). In this embodiment, bracket 4 is made of plastic or rubber and has flexible rod receiving opening 5 that could be placed around the fishing rod with slight pressure. Rod guide hook 18 may be fixed (even molded with the bracket) or may be movable or rotatable as described in more detail below. In the embodiment in FIG. 2, the rod guide hook 18 effectively supports the majority of the weight of lens and the bracket.

In this embodiment bracket 4 includes an opening 5, which is a defined, partially enclosed area for receiving the fishing rod. Preferably opening 5 would have a semicircular or triangular (v) shaped region to receive cylindrical fishing rod 1. Opening 5 may be biased or compressible to close around fishing rod 1, but it is important that neither opening 5 nor bracket 4 exert strong force on the fishing rod. Any force exerted on the fishing rod should be a light grip. In this embodiment, bracket 4 is preferably constructed of a resilient material such as rubber or a suitable polymer to facilitate the bracket engaging the fishing rod. Alternatively opening 5 may be rigid but with or without resilient inserts of different sizes to more closely confirm to the diameter of the fishing rod (while still affording only a "light" amount of grip as defined above). Resilient inserts could be rubber, expanded foam, or other suitable materials well known in the art.

The magnifying lens device of the embodiment in FIG. 2 would be positioned by inserting the fishing rod 1 in opening 5, engaging the bracket 4 against the fishing rod 1, and then lowering the bracket so the rod guide hook 18 rests inside (through) the fishing rod guide, thereby supporting the device. With the rod guide hook 18 hung over the rod guide in this manner, the embodiment shown in FIG. 2 eliminates most if not all of any propensity of the magnifier to rotate around the axis of the fishing rod. As noted above, in this configuration the bracket portion of the invention needs to provide relatively only a light grip on the fishing rod (or in fact could not grip the rod at all but merely rest on it).

Some fishing rod guides are very close to the rod (like in the case of a fly rod) while other guides (such as spinning rod guides) are spaced some distance away from the rod. For this reason, in a preferred embodiment the rod guide hook can be rotated around a vertical axis (in use) so that when in use the hook portion either extends in the direction of the fishing rod (suitable for a guide close to the rod) or extends away from the fishing rod (suitable for a guide a greater distance from the rod). Such a rod guide hook would be rotated to either hook over the front of the guide from the outside (with the hook pointed toward the fishing rod) or hook over front of the guide from the inside with the hook pointed away from the fishing rod. The front of the guide refers to the portion of the circular guide furthest from the fishing rod. The rod guide hook should be in the shape of an inverted capital letter "L", or a rounded inverted hook (having the shape of an inverted capital letter "J") or a squared off inverted hook.

Figure 3:
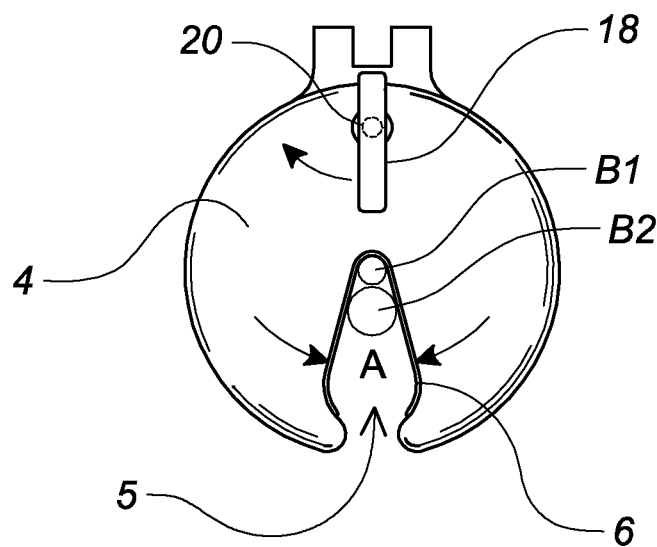
FIG. 3 is a top view of the opening in the bracket of one embodiment of the invention.

FIG. 3 provides a top view of the embodiment of this invention shown in FIG. 2, with FIG. 3 showing more detail on opening 5 in bracket 4. Suitable padding 6 is associated with and conforms to opening 5 to avoid damage to a fragile fishing rod positioned in that opening. In other embodiments similar padding is associated with the portion of the bracket, or the opening in the bracket, that engages the fishing rod. Padding 6 could be rubber, foam, soft fabric, or a variety of other suitable materials.

A preferred configuration of the opening 5 in the bracket is shown in FIG. 3. Opening dimension "A" (referred to as the "width" of the opening) increases as the distance from the rod guide stop increases. This configuration causes the distance between the rod (positioned in opening 5) and rod guide stop 18 to increase with diameter of the fishing rod, as would be consistent with the use of progressively larger guides as rod diameter increases. As shown in FIG. 3, for example, in position B1 distance A is 0.25 inches and in position B2 distance A is 0.375 inches. Thus a fishing rod having a diameter of 0.375 inches would contact opening 5 approximately at position B2. FIG. 3 also shows a rod guide hook 18 (of the type shown in FIG. 2) that is rotatable at joint 20. The benefits of such a rotatable rod guide hook are described above.

Figure 4:
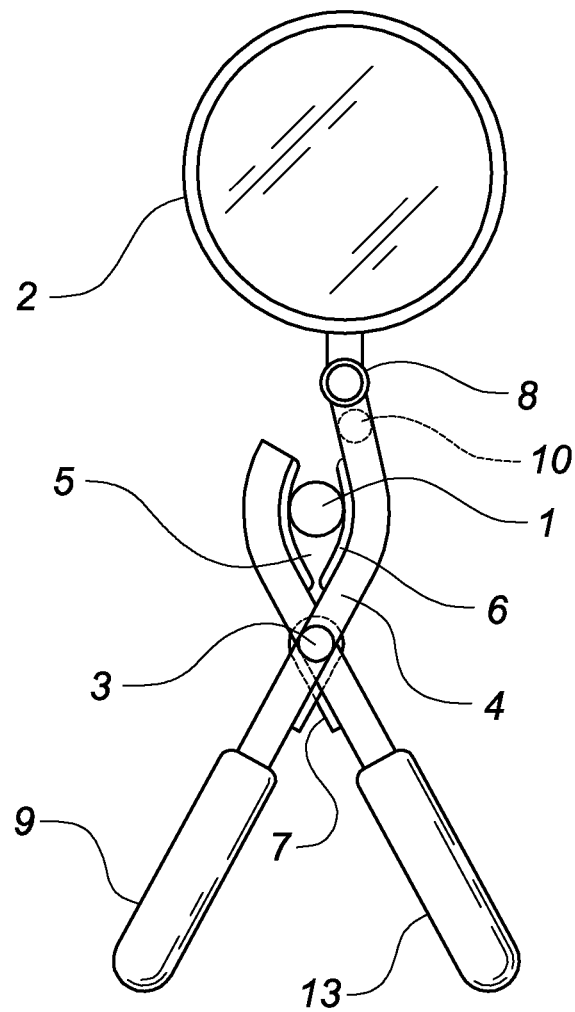
FIG. 4 is a top view of another embodiment of the invention.

In the embodiment shown in FIG. 4 the bracket 4 includes a biased opening 5 that is enlarged at hinge 3 that is biased by spring 7 and that can be expanded by the hand of a user squeezing handles 9 and 13 as known in the art. The opening 5 is expanded by hand force and moved to a position around the fishing rod and then released, with the closed opening engaging the fishing rod and only lightly gripping the fishing rod (or not gripping the fishing rod at all). Padding 6 may be provided on the surface of opening 5 that contacts fishing rod 1. The rod guide stop 10 (below the structure shown in FIG. 4) is inserted in a fishing rod guide from above. When inserted in this manner, the rod guide stop prevents the bracket from sliding down the rod in response to gravity and also prevents it from rotating around the axis of the fishing rod as well as an axis perpendicular to the fishing rod. The rod guide stop 10 may include a rod support extension at its end extending below to rod guide and resting against the fishing rod (below the guide) to further reduce potential rotation of the device "away" from the fishing rod. Alternatively, the rod guide stop in the embodiment shown in FIG. 4 could be a rod guide hook as shown in FIG. 2.

For each of the embodiments, it is desirable that as many components as possible be molded in one piece (such as the bracket and the rod guide stop). It is also desirable that the bracket be designed to receive the lens in a folded position, such as rotation around joint 8, to protect the lens when not in use. It is also desirable to include a loop or ring on the bracket or lens for attachment to a fishing vest or bag—ideally with a retractable line device well known in the art.

It is also desirable in some configurations, such as that in FIG. 1, that the bracket be "pliable"—meaning that is can be adjusted by bending by hand but then retain its shape (as adjusted) while in use supporting the lens on a fishing rod. This pliable bracket could be bent and twisted to lightly grip the fishing rod. Suitable materials and construction of such a pliable bracket would be well known to one skilled in the art. Alternatively, only the rod guide stop could be pliable to permit accommodation of different fishing rod and fishing rod guide configurations.

The rod guide stop is described in the embodiments above as a separate element, but could also constitute a portion of the bracket that contacts a fishing rod guide to prevent movement (particularly vertical movement) of the magnifier.

I claim:

1. A magnifier for attachment to a fishing rod comprising a bracket, a lens, and a rod guide stop.

2. The magnifier of claim 1 wherein the rod guide stop is a rod guide hook.

3. The magnifier of claim 2 further comprising a joint interposed between said bracket and said lens allowing movement of said lens on at least one axis relative to said bracket.

4. The magnifier of claim 2 further comprising a ball joint interposed between said bracket and said lens.

5. The magnifier of claim 1, said bracket having an opening for receiving a fishing rod.

6. The magnifier of claim 5, further comprising a joint interposed between said bracket and said lens allowing movement of said lens on at least one axis relative to said bracket.

7. The magnifier of claim 5, wherein said rod guide stop is a rod guide hook.

8. The magnifier of claim 2 wherein said rod guide hook is rotatable.

9. The magnifier of claim 1 wherein said rod guide stop is below said bracket when said magnifier is attached to said fishing rod.

10. The magnifier of claim 8 further comprising a joint interposed between said bracket and said lens allowing movement of said lens on at least one axis relative to said bracket.

11. The magnifier of claim 8 further comprising a ball joint interposed between said bracket and said lens.

12. The magnifier of claim 8, said bracket having an opening for receiving a fishing rod.

13. The magnifier of claim 1, further comprising a joint interposed between said bracket and said lens allowing movement of said lens on at least one axis relative to said bracket.

14. The magnifier of claim 1, further comprising a ball joint interposed between said bracket and said lens.

15. The magnifier of claim 5, said opening having an increasing width as the distance from said rod guide stop increases.

16. A magnifier for attachment to a fishing rod comprising a bracket, a lens, and means for utilizing a fishing rod guide to prevent movement of said bracket.

17. The magnifier of claim 16, said bracket having an opening for receiving a fishing rod.

18. The magnifier of claim 17, said opening further comprising padding.

* * * * *